3,117,947
POLYOLEFINE ANTIOXIDANTS
John Michael Turner, St. Hilaire, Quebec, Canada, assignor to Canadian Industries Limited, Montreal, Quebec, Canada, a corporation of Canada
No Drawing. Filed Oct. 2, 1961, Ser. No. 142,013
Claims priority, application Great Britain Oct. 6, 1960
1 Claim. (Cl. 260—45.9)

This invention relates to new chemical compounds and to their use as stabilizers of monoolefine polymers against degradation by thermal oxidation.

The term "monoolefine polymer" as used herein means essentially saturated hydrocarbon polymers derived from monoolefines and containing tertiary hydrogen atoms, i.e., hydrogen atoms attached to tertiary carbon atoms. Examples of such polymers are homopolymers and copolymers of ethylene, propylene, 1-butene, 3-methyl-1-pentene and other olefines having more carbon atoms, provided that the polymers contain tertiary hydrogen atoms. In such monoolefine polymers as polypropylene the tertiary carbon atoms are positioned in an orderly manner, whereas they occur in random positions in polyethylene.

It is known that monoolefine polymers are very useful for wirecoating and cable sheathing due to their toughness, abrasion resistance and water impermeability. However, when the coating or sheathing is done by extrusion, it is necessary to maintain the polymers at high temperatures for some time in order to render them sufficiently fluid as to be capable of extrusion. During this maintenance at high temperatures, thermal oxidation of the polymers frequently takes place, thus degrading the polymers and vitiating the very properties which make the polymers desirable for the above applications.

It is an object of this invention to provide new chemical compounds which are efficient stabilizers of monoolefine polymers against degradation by thermal oxidation, together with methods for preparing said compounds.

Another object of the invention is to provide a new process for stabilizing monoolefine polymers against degradation by thermal oxidation and thus to provide monoolefine polymers of improved thermal stability.

Additional objects will appear hereinafter.

The new chemical compounds of this invention are 4-hydroxybenzyl-N,N-dialkyldithiocarbamates wherein at least one radical selected from tertiary alkyl and tertiary cycloalkyl radicals is in the ortho position to the hydroxyl group. These compounds have the formula:

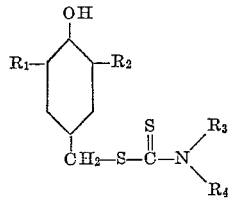

wherein $R_1$ is selected from the group consisting of tertiary alkyl and tertiary cycloalkyl radicals, $R_2$ is selected from the group consisting of hydrogen and the lower alkyl, tertiary alkyl and tertiary cycloalkyl radicals and $R_3$ and $R_4$ are lower alkyl radicals containing from 1 to 12 carbon atoms. Examples of such compounds are 3,5-di-tert-butyl 4-hydroxybenzyl-N,N-dimethyldithiocarbamate, 3-tert-butyl 5-methyl 4-hydroxybenzyl-N,N-dimethyldithiocarbamate, 3-tert-butyl 5-methyl 4-hydroxybenzyl-N,N-dimethyldithiocarbamate, 3-methylcyclohexyl 5-methyl 4-hydroxybenzyl - N,N - diethyldithiocarbamate, 3,5 - dimethylcyclohexyl 4-hydroxybenzyl-N,N-dilauryldithiocarbamate, and 3,5-di-tert-butyl 4-hydroxybenzyl-N-methyl-N-butyldithiocarbamate. It is essential that at least one tertiary carbon atom be linked to the benzene ring in the ortho position to the hydroxyl group, the said atom being provided by the tertiary alkyl or tertiary cycloalkyl radicals, for example tert-butyl and methyl cyclohexyl.

The above new compounds may be prepared by the following methods: the reaction of a 3,5-dialkyl 4-hydroxybenzyl halide with an alkaline N,N-dialkyldithiocarbamate in absolute alcohol or with the corresponding zinc salt in chloroform; the reaction of a suitable Mannich base, i.e., a N,N-dialkyl 3,5-dialkyl 4-hydroxybenzyl amine, with carbon disulphide, and finally the reaction of a 2,6-dialkyl phenol with paraformaldehyde, a secondary amine and carbon disulphide.

In accordance with another object of the invention, a new process for the stabilization of monoolefine polymers against degradation by thermal oxidation comprises incorporating with said polymers from 0.0002% to 1.0% by weight, preferably about 0.02%, of a 4-hydroxybenzyl-N,N-dialkyldithiocarbamate of the type hereinbefore described.

The stabilizers are suitably incorporated with the monoolefine polymers by softening the latter on a roll mill at about 10° C. above their melting points and then adding the stabilizers thereto in a benzene solution.

The above process yields a new composition of matter which is another feature of this invention, the said composition comprising a monoolefine polymer in admixture with from 0.002% to 1.0% by weight of a 4-hydroxybenzyl-N,N-dialkyldithiocarbamate of the type above described.

The invention will be more fully illustrated by the following examples which are not intended to limit the scope of the invention to the embodiments described.

EXAMPLE 1

3,5-di-tert-butyl 4-hydroxybenzyl-N,N-diethyldithiocarbamate was prepared as follows:

20 g. of 2,6 di-tert-butyl phenol, 3 g. of paraformaldehyde, 7.5 g. of diethylamine and 10 g. of carbon disulphide were refluxed for 18 hours on a steam bath. The excess of $CS_2$ was then distilled off and 100 ml. of 65°–110° C. petroleum ether added to the residue. After standing 3 hours at 0° C., the crystalline product was removed by filtration and after recrystallization from petroleum ether it melted at 98° C. and was characterized by its infrared absorption spectrum.

200 g. of a branched polyethylene made by the known high pressure process and having a melt index of 7 was heated to 120° C. on a roll mill and 0.04 g. of 3,5-di-tert-butyl 4-hydroxybenzyl - N,N - diethyldithiocarbamate was added thereto in 20 ml. of benzene. The latter was then evaporated and the dithiocarbamate was distributed throughout the polyethylene. Samples of the latter were then pressed in plates 4 x 4 x 0.035 inch and each sample was placed on aluminium foil in an oven maintained at 150° C. with provision for continuous weighing of the samples. During an induction period a slight loss in weight was observed. When the dithiocarbamate was consumed, a rapid increase in weight occurred, and the length of the induction period for the sample containing the dithiocarbamate of this invention was compared with that of similar samples containing two well known commercial stabilizers.

| Stabilizer: 0.02% by weight of polyethylene: | Induction period (hrs. at 150° C.) |
|---|---|
| 3,5 - di-tert-butyl 4-hydroxybenzyl-N,N-diethyldithiocarbamate | 90 |
| 4,4-thio-bis (3 methyl 6-tert-butyl phenol) | 46 |
| 2,2 - methylene - bis (4-methyl, 6-methylcyclohexyl phenol) | 57 |

EXAMPLE 2

Further compounds according to this invention were prepared by the method of Example 1 and tested in a similar manner at a level of 0.02% by weight in polyethylene. The results are given in Table I; the R substituents refer to the molecular drawing given hereinbefore.

*Table I*

| $R_1$ | $R_2$ | $R_3$ and $R_4$ | Melting point, degrees | Induction Period (hours) |
|---|---|---|---|---|
| t-butyl | Methyl | Ethyl | 94 | 62 |
| Do | t-butyl | do | 98 | 90 |
| Do | do | Methyl | 146 | 61 |
| Do | do | n-butyl | 69 | 97 |
| Do | Methyl | do | oil | 78 |

EXAMPLE 3

Two samples of polyethylene, one containing 0.5% of 3,5-di-tert-butyl 4-hydroxybenzyl - N,N - diethyldithiocarbamate and the other 0.5% of 2,2-methylene-bis (4 methyl,6-methylcyclohexyl phenol) were roll milled for 3 hours at 170° C. At the end of this time, the first sample containing the antioxidant of this invention was a pale cream colour, while the record sample was a dark orange brown. The nonstaining properties of the new antioxidants were thus demonstrated.

EXAMPLE 4

The 3,5-di-tert-butyl 4-hydroxybenzyl-N,N-diethyldithiocarbamate was tested as an antioxidant in polypropylene by an embrittlement test on plaques held at 140° C. With no antioxidant the plaques become brittle in under 24 hours; using 1.0% by weight of antioxidants this time was extended to 45 hours.

What I claim is:

A process for stabilizing a polymer selected from the group consisting of polyethylene and polypropylene against degradation by thermal oxidation which comprises incorporating with said polymer from 0.0002% to 1.0% by weight of a 4-hydroxybenzyl-N,N-dialkyldithiocarbamate selected from the group consisting of 3-tert-butyl-5-methyl 4-hydroxybenzyl-N,N-diethyldithiocarbamate, 3,5-di-tert-butyl 4 - hydroxybenzyl-N,N-diethyldithiocarbamate, 3,5-di-tert-butyl 4-hydroxybenzyl-N,N-dimethyldithiocarbamate, 3,5-di-tert-butyl 4-hydroxybenzyl-N,N-dibutyldithiocarbamate and 3-tert-butyl-5-methyl 4-hydroxybenzyl-N,N-dibutyldithiocarbamate.

References Cited in the file of this patent

UNITED STATES PATENTS 2,757,174    Hardman _____ July 31, 1956